United States Patent [19]

Ishikawa et al.

[11] 4,290,044
[45] Sep. 15, 1981

[54] VEHICLE LEVEL DETECTOR

[76] Inventors: Hiroshi Ishikawa, 5-6447, Iriya, Zama-shi, Kanagawa-ken; Mamoru Ichikawa, 715, Aiko, Atsugi-shi, Kanagawa-ken, both of Japan

[21] Appl. No.: 49,962

[22] Filed: Jun. 19, 1979

[30] Foreign Application Priority Data

Jun. 23, 1978 [JP] Japan .................................. 53-76258

[51] Int. Cl.³ ............................................. G08B 21/00
[52] U.S. Cl. .................................. 340/52 H; 340/689
[58] Field of Search ................... 340/52 R, 52 H, 61, 340/689, 679, 666

[56] References Cited

U.S. PATENT DOCUMENTS

3,531,766  9/1970  Henzel ............................. 340/52 R
3,634,635  1/1972  Ellis ................................ 340/52 R

FOREIGN PATENT DOCUMENTS

1205714  9/1970  United Kingdom .
1322562  7/1973  United Kingdom .
1329627  9/1973  United Kingdom .
1416940  12/1975 United Kingdom .

*Primary Examiner*—Alvin H. Waring
*Attorney, Agent, or Firm*—Marvin Feldman; Stephen E. Feldman

[57] ABSTRACT

A vehicle level detector detects a change in the elevation of a vehicle body as reflected in a change in the relative distance between a suspension member for wheels of the vehicle and the vehicle body. The detector comprises a magnet and a magnetoelectric transducer element disposed in opposing relationship. One of the magnet and the transducer element is disposed for displacement relative to the other in accordance with a varying elevation of the vehicle body, thus permitting a change in the elevation of the vehicle body to be detected by sensing the displacement.

19 Claims, 10 Drawing Figures

VEHICLE LEVEL DETECTOR

BACKGROUND OF THE INVENTION

The present invention relates to a vehicle level detector which detects a change in the level of a vehicle as reflected in a varying relative distance between a suspension member and the lower surface of a vehicle body or carrosserie.

During the running of a vehicle, it is necessary to make a correction for any abnormal variation in the elevation of a vehicle body which exceeds a normal range of elevation change. A conventional detector comprises a reed switch which detects a change in the relative distance between a suspension member and the lower surface of the vehicle body. While the reed switch is arranged to be switched on and off in accordance with a varying elevation of the vehicle body to thereby detect such variation, the switching of the reed switch which is frequently repeated as the vehicle body moves up and down causes an increased amount of wear of a movable switch contact, giving rise to a poor electrical contact.

This also degrades the durability, and hence such a switch cannot be used over a prolonged period of time.

SUMMARY OF THE INVENTION

The invention contemplates the elimination of above disadvantage of conventional vehicle level detector, by avoiding the use of a switching member such as reed switch which depends on mechanical contacts for its operation, but employing a contact-free switching element.

It is an object of the invention to provide a vehicle level detector which has an improved durability by using a contact-free switching element.

It is a specific object of the invention to provide a vehicle level detector in which a switching element is formed by a magnetoelectric transducer element and a multi-pole magnet.

In accordance with the present invention, there is provided a vehicle level detector which detects a change in the elevation of the vehicle body as reflected in a change in the relative distance between a suspension member and the vehicle body, comprising a magnet and a magnetoelectric transducer element disposed in opposing relationship, one of the transducer elements and the magnet being adapted to be displaced relative to one another in accordance with a varying elevation of the vehicle body.

Preferably, one of the transducer element and the magnet is mounted on the vehicle body while the other is connected with the suspension member.

The magnetoelectric transducer element may comprise a Hall element, which may be formed as an integrated circuit element. The transducer elements are fixedly mounted on a vehicle body with a given spacing therebetween which defines a dead zone corresponding to a normal range of variation of the elevation. Where the magnet is movable, the range of its movement is limited by stops. In another aspect of the invention, an actuating member is provided which includes means for temporarily maintaining the magnet in its displaced position whenever a displacement of the magnet is detected which indicates that the elevation of the vehicle body exceeds a normal range of elevation.

With the present invention, the use of a contact-free magnetoelectric transducer element enables its switching to be repeated as many times as desired and avoids any degradation in its operation over a prolonged period of use, thus providing an economical vehicle level detector having an improved durability.

Above and other objects, features and advantages of the invention will be apparent from the hereinafter illustrated preferred embodiments of the invention.

BRIEF DESCRIPTION OF THE DRAWINGS

The invention will be illustrated more fully by way of examples with reference to the accompanying drawings, in which.

DESCRIPTION OF THE PREFERRED EMBODIMENT

Figure 1:
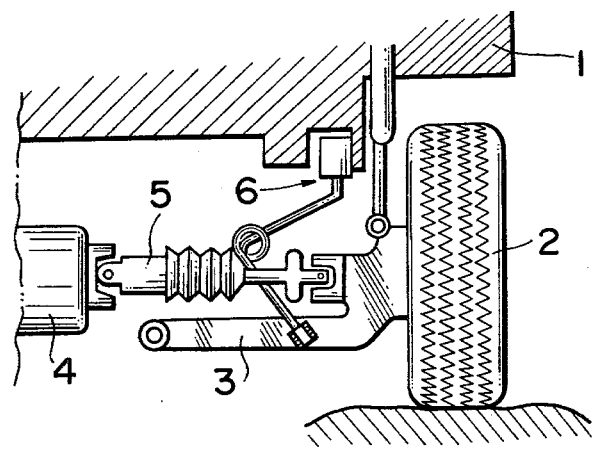
FIG. 1 is a schematic illustration of a vehicle level detector in accordance with the first embodiment of the invention, as applied to a vehicle.
Figure 3:
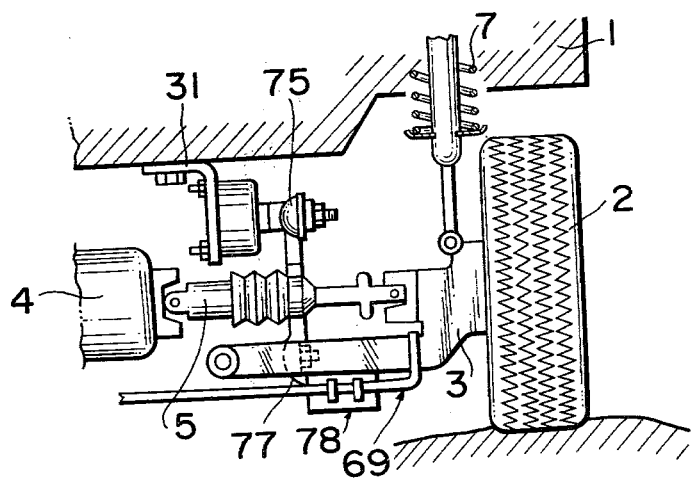
FIG. 3 is a schematic fragmentary front elevation of a vehicle level detector in accordance with another embodiment of the invention.
Figure 2:
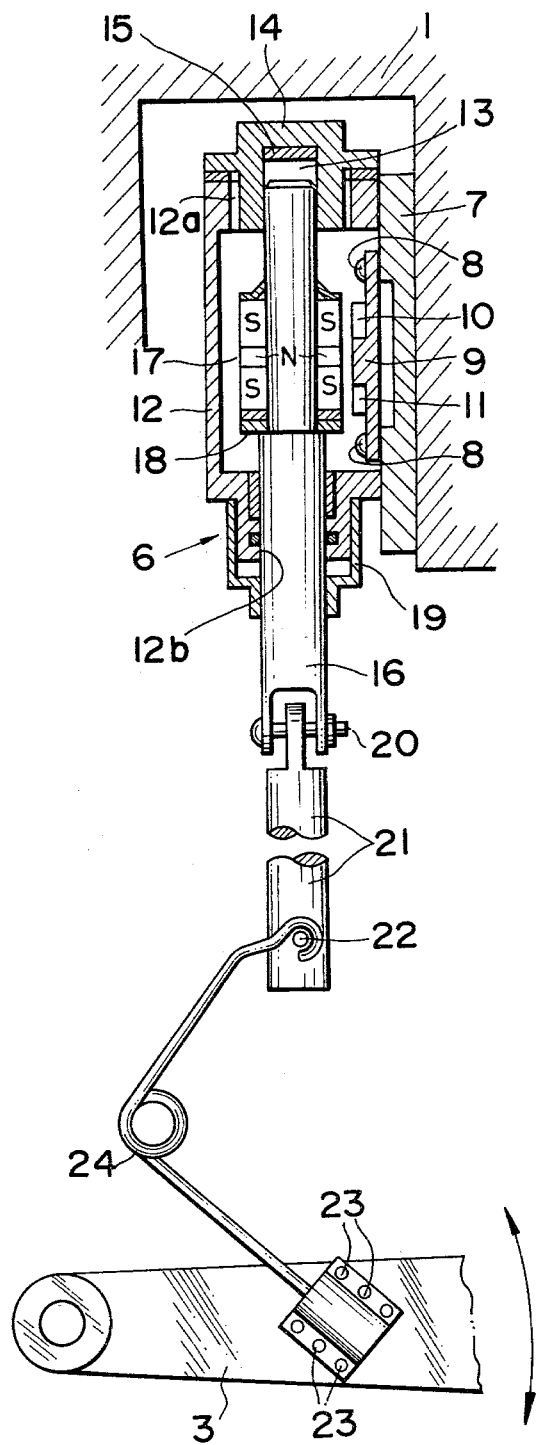
FIG. 2 is an enlarged fragmentary elevational view, of the vehicle level detector of FIG. 1.
Figure 4:
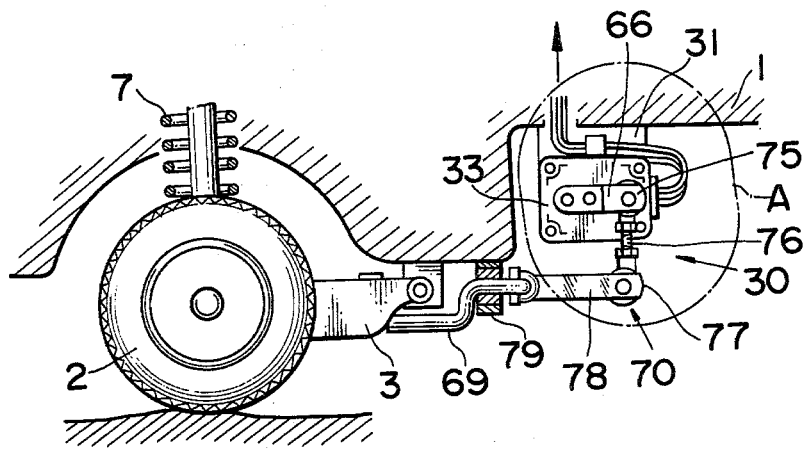
FIG. 4 is a side elevational view of the detector of FIG. 3.
Figure 5:
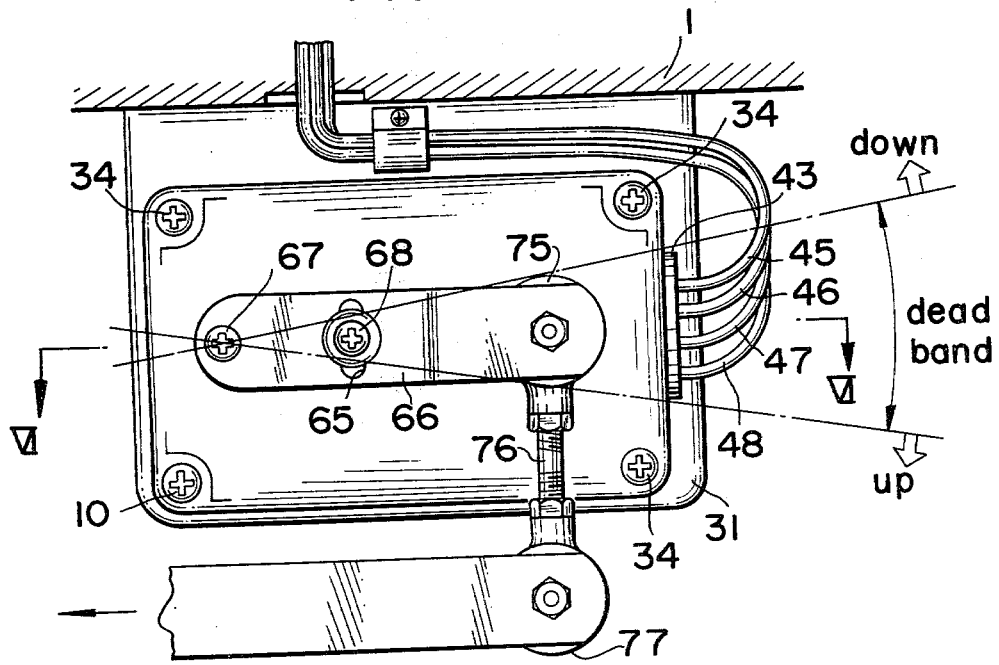
FIG. 5 is a fragmentary enlarged view of a portion A of FIG. 4
Figure 6:
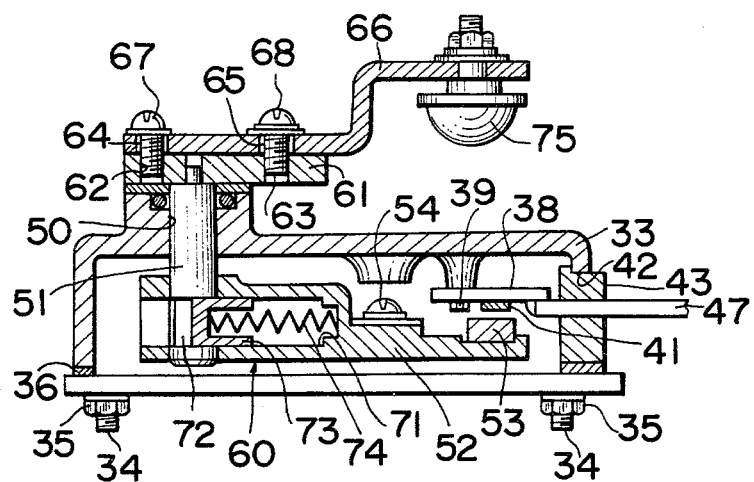
FIG. 6 is a cross sectional view taken along line VI—VI of FIG. 5.
Figure 7:
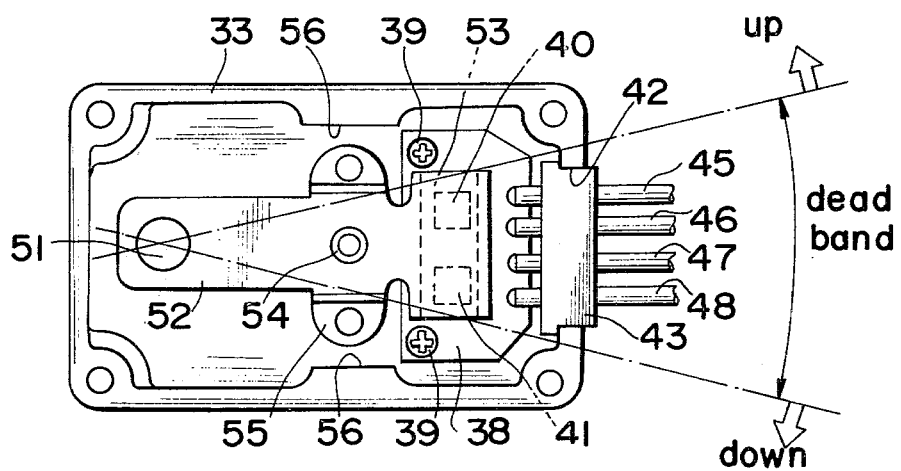
FIG. 7 is a view of the detector of FIG. 6, as viewed in a direction indicated by an arrow D.

Referring to FIGS. 1 and 2, there is shown a body 1 of a vehicle including a wheel 2 which is rotatably mounted on a trailing arm 3 and to which a drive from a differential unit 4 is transmitted through a drive shaft 5. A vehicle level detector according to the first embodiment of the invention is generally represented by reference numeral 6 and has its one end attached to the vehicle body 1 at a point about the trailing arm 3 and its other end attached to the trailing arm 3.

Referring to FIG. 2, the detector 6 comprises a base plate 7 which is secured to the vehicle body 1 by means of bolts (not shown) a stationary member 9 secured to the base plate 7 by means of set screws 8, and a pair of Hall IC elements 10 and 11 which are mounted on the stationary member 9 and which are vertically spaced apart by a distance which corresponds to the breadth of a dead band. Additionally, a cylindrical cover 12 which opens toward the stationary member 9 is attached to the base plate 7 by means of bolts. The cover 12 is formed with a threaded top opening 12a which is engaged and closed by a cap 14 having a recess 13 formed therein. A stop 15 is fixedly mounted in the recess 13, and a vertically movable shank 16 extends through an opening 12b formed in the lower portion of the cover 12 and has its top end received in the recess 13. A cylindrical magnet 17 is mounted on the shank within the cover 12, and includes three poles arranged in the sequence of S-, N- and S-poles. Another stop 18 is fixedly mounted on the shank 16 below the magnet 17 and the bottom of the cover 12 in the region of the opening 12b is surrounded and closed by a shroud 19. The lower end of the shank 16 is pivotally connected, by means of pin 20, with a shaft 21, the lower end of which fixedly carries a pin 22 which is pivotably engaged by one end of an arm 24, the other end of which is in turn connected with the trailing arm 3 by means of set screws 23. The arm 24 is formed of a resilient wire material such as a piano wire, and a loop is formed therein as shown.

In operation, when the vertical elevation of the vehicle body is reduced relative to the trailing arm 3, the shank 16 carrying the magnet 17 will be displaced upwardly to bring the N-pole of the magnet 17 into opposing relationship with the Hall element 10. This activates the Hall element 10 while the other Hall element 11 will be deactivated by the S-pole. At the same time, the upper end of the shank 16 bears against the stop 15, preventing a further upward movement thereof. Any force which causes the shank 16 to move upward after abutment against the stop 15 will be absorbed by the arm 24, which prevents a movement of the shank 16 and maintains the Hall element 10 activated. After a given time interval, the element 10 produces a suction signal which is transmitted to a hydropneumatic device.

Conversely, when the vehicle body moves up relative to the trailing arm 3, the shank 16 carrying the magnet 17 will be displaced downwardly, whereby the N-pole of the magnet 17 will move into alignment with the other Hall element 11, thus activating it and deactivating the element 10 by the S-pole. At the same time, the stop 18 bears against the lower end of the cover 12, thus preventing a further downward movement of the shank 16. Any force which causes the shank 16 to move downward after abutment of the stop 18 against the lower end of the cover 12 will be absorbed by the arm 24, which again prevents the movement of the shank 16 and maintains the element 11 activated. After a given time interval, the element 11 produces an exhaust signal which is transmitted to the hydropneumatic device.

When the vehicle body assumes an elevation in a normal range or a dead band, both Hall elements 10 and 11 will be aligned with the S-poles of the magnet 17 and remained off. The resulting operation of the Hall element 10 and 11 is indicated by the table given below.

TABLE A

| Elevation | Element 10 | Element 11 |
| --- | --- | --- |
| Normal range | off | off |
| Lower elevation | on | off |
| Higher elevation | off | on |

The magnet 17 used has a cylindrical configuration in order to maintain a constant spacing between the Hall elements 10 and 11 and the magnet 17 in the event that torsion is imparted to the shank 16 which is connected through the shaft 21 and the arm 24 with the trailing arm 3 which is subject to a three dimensional movement in response to a vertical movement of the vehicle body 1. Hence it will be understood that the use of a cylindrical magnet 17 may be avoided if twisting of the shank 16 is prevented, as by using a splined shank. It is also to be noted that instead of using a magnet having three poles, a magnet having two poles may be similarly used.

Referring to FIGS. 3 to 7, there is shown another embodiment of the invention. As before, a wheel 2 is rotatably mounted on a trailing arm 3, and a drive from a differential unit 4 is transmitted thereto through a drive shaft 5. A vehicle level detector 30 of this embodiment includes a bracket 31 in the form of a flat plate, serving as a stationary member, which is secured to a vehicle body 1 as by welding or by bolts. A box-shaped cover 33 is secured to the bracket 31 by a plurality of bolts 34 and nuts 35 with gaskets 36 interposed therebetween. A mounting plate 38 is fixedly connected with the top wall of the cover 33 by means of set screws 39, and a pair of magnetoelectrical transducer elements or Hall elements 40, 41 are fixedly mounted on the mounting plate 38. The Hall elements may be formed by integrated circuit elements. In one side thereof, the cover 33 is formed with a notch 42 in which is fitted a grommet 43. A plurality of lead wires 45, 46, 47 and 48 extend through the grommet 18 and have their ends connected with the Hall elements 40 and 41. The top wall of the cover 33 is formed with an opening contiguous with an axial sleeve 50 which receives a shaft 51. An arm 52 is rotatably mounted on the lower end of the shaft 51, and a magnet 53 having two poles is secured on the free end of the arm 52 in vertical alignment with the Hall elements 40, 41. Intermediate its length, the arm 52 is provided with a stop 55 secured thereto by set screw 54 and which is adapted to bear against abutment surfaces 56 formed on the cover 33, thereby limiting the angle through which the arm 52 is movable. There is provided a rotary mechanism 60 which permits a rotation of the shaft 51 if a rotation of the arm 52 is prevented by the stop 55. A mounting member 61 is secured to the top end of the shaft 51 for integral rotation therewith. Toward its opposite ends, the mounting member 61 is formed with threaded bores 62 and 63, and a arm 66 is clamped to the mounting member 61 by passing bolts 67, 68 through an circular opening 64 and an elongate slot 65 formed therein and threadably engaging them with the threaded bores 62, 63. A linkage 70 is mounted on a stabilizer 69 which has its one end mounted on the free end of the arm 66 and its other end secured to the trailing arm 3. The rotary mechanism 60 comprises a cylinder 71 formed on the arm 52, a semi-circular notch 72 formed in a portion of the shaft 51 which extends through the cylinder 41, a piston 73 received in the notch 72 for sliding movement within the cylinder 71, and a spring 74 which normally urges the piston 73 toward the shaft 51. The linkage 70 comprises a ball joint 75 which is rotatably mounted on the arm 66, a link 76 having its one end threadably engaged with the ball joint 75 and its other end threadably engaged with another ball joint 77, and another link 78 having one end on which the ball joint 75 is rotatably mounted and other end which is fixedly connected with the stabilizer 69. It is to be noted that the stabilizer 39 is mounted on the vehicle body 1 with a rubber bushing 79 interposed therebetween.

Figure 8:
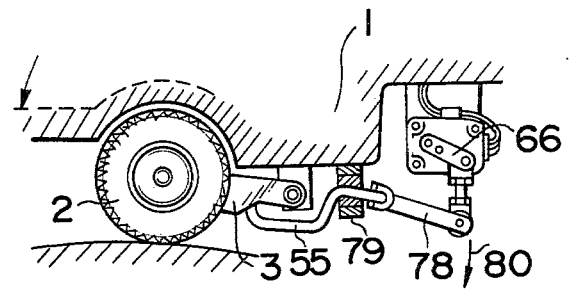
FIGS. 8 and 9 are similar views to FIG. 4, showing different operative conditions.
Figure 9:
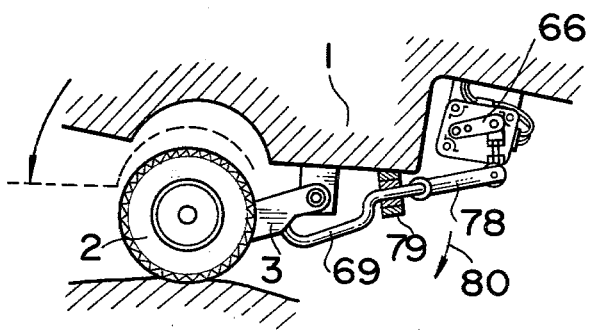

In operation, when the elevation of the vehicle body is reduced relative to the trailing arm 3 as shown in FIG. 8, the stabilizer 69 and the link 78 angularly move about the rubber bushing 79, which defines a fulcrum, in a direction indicated by an arrow 80. This causes the arm 52 to be rotated in the same direction through the ball joint 76, link 77, ball joint 75, arm 66 and shaft 51. Such rotation of the arm 52 is effective to angularly move the magnet 53 in the same direction, thereby activating or turning on the Hall elements 40 and 41. Consequently, after a given time interval, these elements produce a suction signal which is transmitted to a hydropenumatic device. When the elevation of the vehicle body increases relative to the trailing arm 3 as shown in FIG. 9, the stabilizer 69 and the link 78 rotate about the rubber bushing 79 in the direction opposite from that indicated by the arrow 50. This motion is transmitted through the ball joint 76, link 47, ball joint 75, arm 66 and shaft 51 the arm 52 to cause a rotation thereof in the same direction. Consequently, the magnet 53 rotates in the same direction for deactivating or turning of the elements 40 and 41. Thus, after a given time interval, the elements produce an exhaust signal which is transmitted to the hydropenumatic device.

When the elevation of the vehicle body is in a normal range or in its dead band, the Hall element 15 is located opposite to the S-pole of the magnet 53 to be deactivated, while the element 41 is located opposite to the N-pole thereof to be activated.

Figure 10:
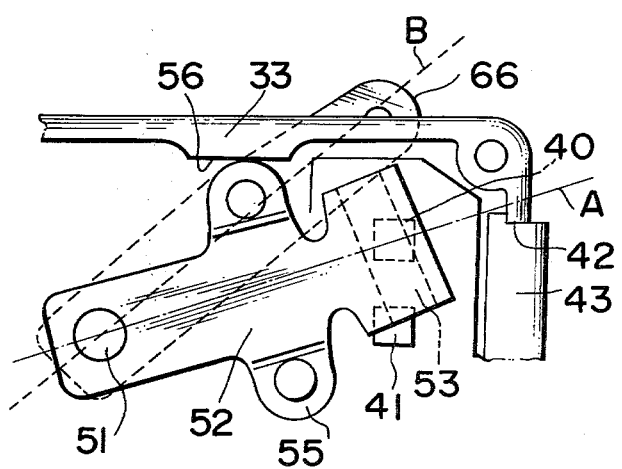
FIG. 10 is a partial illustration, showing the positional relationship of arms of FIG. 7.

When the elevation of the vehicle body varies greatly to exceed the dead band, the rotary mechanism 60 absorbs an overstroke of the arm 52 to maintain the arm 52 which carries the magnet 53 in a position where one of the stops 55 bears against the corresponding abutment surface 56. After a given time interval, the elements produce either suction or exhaust signal to be transmitted to the hydropenumatic device. In this manner, the cover 33 can be minimized in size. When the vehicle body 1 returns to its normal position after having been raised or lowered, the rotary mechanism 60 maintains the arm 52 in position until the centerline B of the arm 66 coincides with the centerline A of the arm 52 as shown in FIG. 10, continuing to produce either suction or exhaust signal. The suction or exhaust signal is interrupted at the moment when the boundary between the S- and N-poles or the magnet 53 mounted on the arm 52 passes over the elements 40 and 41. The operation of the Hall elements 40 and 41 is summarized in the table B below.

TABLE B

| Elevation | Element 40 | Element 41 |
| --- | --- | --- |
| lower elevation | on | on |
| normal range | off | on |
| higher elevation | off | off |

The normal position of the vehicle body can be adjusted by changing the length of the link 47 between the ball joints 75 and 76, or by loosening the bolts 67 and 68 to establish a given angle between the centerline A of the arm 52 and the centerline B of the arm 66.

In the embodiment described, the magnet has two poles, but may be replaced by a magnet having three poles.

From the foregoing description, it will be appreciated that the use of a magnetoelectric transducer element such as Hall elements provides a useful life of the detector which is virtually unlimited, thus achieving a substantial improvement over the use of the reed switch. The use of an angularly movable arm facilitates an adjustment of the normal position of the vehicle body. Finally, the provision of the rotary mechanism between the arm and the linkage permits the extent of rotation of the arm to be limited, thus permitting the use of a magnet and hence a sensor of a smaller size.

What is claimed is:

1. A vehicle level detector which detects a change in the elevation of a vehicle body as reflected in a change in the relative distance between a suspension member and a lower surface of the vehicle body, comprising at least two magnetoelectric transducer elements which are fixedly mounted on the lower surface of the vehicle body and spaced apart a given distance, a movable magnet disposed in opposing relationship with the transducer elements, and an actuating member connected between the magnet and the suspension member for actuating the magnet in accordance with a change in the relative distance between the suspension member and the vehicle body, a displacement of the magnetic selectively activating or deactivating the transducer elements, thereby producing a signal indicative of the elevation of the vehicle body.

2. A vehicle level detector according to claim 1 in which the transducer elements comprises Hall elements which are spaced apart a given distance which defines a dead band thereof.

3. A vehicle level detector according to claim 1 in which the transducer elements comprise Hall integrated circuit elements which are fixedly mounted on the vehicle body at a given spacing from each other which defines a dead band thereof.

4. A vehicle level detector according to one of claims 1 to 3, further including stop means which limits the extent of movement of the movable magnet.

5. A vehicle level detector according to claim 4, further including means for maintaining the magnet in its displaced position for a given time interval whenever the elevation of the vehicle body has changed beyond a normal range thereof.

6. A vehicle level detector for detecting a change in the elevation of a vehicle body as reflected in a change in relative distance between a suspension member and the vehicle body, comprising:
a detector housing secured on a vehicle body;
a magnet and magnetoelectric transducer element disposed within said detector housing in opposing relationship, one of said magnet and magnetoelectric transducer element is secured on the internal surface of said detector housing and the other is movable with respect to said one of them secured on said housing,
whereby said the other one movable with respect to the one secured to said detector housing being adapted to be displaced relative to one another corresponding to varying of the vehicle body.

7. A vehicle level detector for detecting a change in the elevation of a vehicle body as reflected in a change in relative distance between a suspension member and the vehicle body, comprising:
a detector housing secured on the lower surface of the vehicle body;
a magnet and magnetoelectric transducer element disposed within said detector housing in opposing relationship, said magnetoelectric transducer element being secured to the internal surface of said detector housing and said magnet being movable relative to said magnetoelectric transducer element,
whereby said transducer element and said magnet being adapted to be displaced relative to the other corresponding to varying of elevation of the vehicle body with respect to the suspension member.

8. A vehicle level detector for detecting a change in the elevation of a vehicle body as reflected in a change in the relative distance between said vehicle body and a suspension member, comprising:
a hollow detector housing secured onto the lower surface of said vehicle body; and
a magnet and a magnetoelectric transducer element disposed within said detector housing in opposing relationship, said magnetoelectric transducer element being secured on the internal periphery of said detector housing and having at least two poles each of which are located in aparted relationship with respect to the other and said magnet being substantially vertically movable with respect to said transducer element corresponding to varying of relative distance between said vehicle body and suspension member.

9. A vehicle level detector for detecting a change in the elevation of a vehicle body as reflected in a change in the relative distance between said vehicle body and a suspension member, comprising:

a detector housing secured onto the lower surface of said vehicle body;

a magnet and magnetoelectric transducer element disposed within said detector housing in opposing relationship with respect to one another, said transducer element being secured onto the internal periphery of said detector housing and have at least two poles in aparting relationship with respect to one another and said magnet being substantially vertically movable with respect to said transducer element;

a means for connecting said magnet to said suspension member to transmit relative displacement between said vehicle body and said suspension member and thereby to move said magnet with respect to said transducer element corresponding to varying of distance between said vehicle body and said suspension member.

in the relative distance between the suspension member and the vehicle body, a displacement of the magnet selectively activating or deactivating the transducer elements, thereby producing a signal indicative of the elevation of the vehicle body.

10. A vehicle level detector according to any one of claims 6 to 9 inclusive, wherein the transducer elements comprises Hall elements which are spaced apart a given distance which defines a dead band thereof.

11. A vehicle level detector according to any one of claims 6 or 7, wherein the transducer elements comprise Hall integrated circuit elements which are fixedly mounted on the vehicle body at a given spacing from each other which defines a dead band thereof.

12. A vehicle level detector according to any one of claims 6 to 9 inclusive, wherein said detector further includes stop means which limits the extent of movement of the movable magnet.

13. A vehicle level detector according to claim 10, wherein said detector further includes stop means which limits the extent of movement of the movable magnet.

14. A vehicle level detector according to claim 11, wherein said detector further includes stop means which limits the extent of movement of the movable magnet.

15. A vehicle level detector according to any one of claims 6 to 9 inclusive, wherein said detector further includes a means for maintaining the magnet in its displaced position for a given time interval whenever the elevation of the vehicle body has changed beyond a normal range thereof.

16. A vehicle level detector according to claim 10, wherein said detector further includes a means for maintaining the magnet in its displaced position for a given time interval whenever the elevation of the vehicle body has changed beyond a normal range thereof.

17. A vehicle level detector according to claim 11, wherein said detector further includes a means for maintaining the magnet in its displaced position for a given time interval whenever the elevation of the vehicle body has changed beyond a normal range thereof.

18. A vehicle level detector according to claim 12, wherein said detector further includes a means for maintaining the magnet in its displaced position for a given time interval whenever the elevation of the vehicle body has changed beyond a normal range thereof.

19. A vehicle level detector according to claim 1, 2 or 5, further including means for maintaining the magnet in its displaced position for a given time interval whenever the elevation of the vehicle body has changed beyond a normal range thereof.

* * * * *